Patented Aug. 27, 1940

2,212,943

UNITED STATES PATENT OFFICE 2,212,943

FLUSHING DEVICE, MORE PARTICULARLY FOR WATER CLOSETS

Michael Kolarik, Vienna, Germany

Application November 16, 1938, Serial No. 240,605.
Renewed January 20, 1940. In Austria November 16, 1937

6 Claims. (Cl. 4—32)

This invention relates to a flushing device, more particularly for water-closets, in which an outer vessel provided with the discharge pipe for the flushing water houses a tiltable water vessel that may be discharged into the surrounding vessel by tilting. The invention chiefly consists in that within the tiltable vessel, a further stationary vessel is accommodated the walls of which are provided with apertures. This allows of discharging the tiltable vessel in a smooth and uniform way. A jerky discharge of the tiltable vessel, causing a great noise during the flushing operation, has been eliminated. If the two vessels are provided with cylindrical or spherical walls and arranged coaxially or concentrically, respectively, the tiltable vessel may swing about the inner stationary vessel, whereby according to the extent of the tilting movement more or less water is discharged. If the walls of the two water vessels are disposed in a small distance from each other and if the wall of the inner vessel is given a uniform sieve-like perforation, the tiltable vessel functions as an outer cover of the sieve-like apertures of the inner stationary vessel and discloses said apertures when it is being tilted. A special advantage of the novel design resides in that a very fine regulation of the flushing water quantity is possible by changing the tilting way of the outer vessel.

Figure 1:
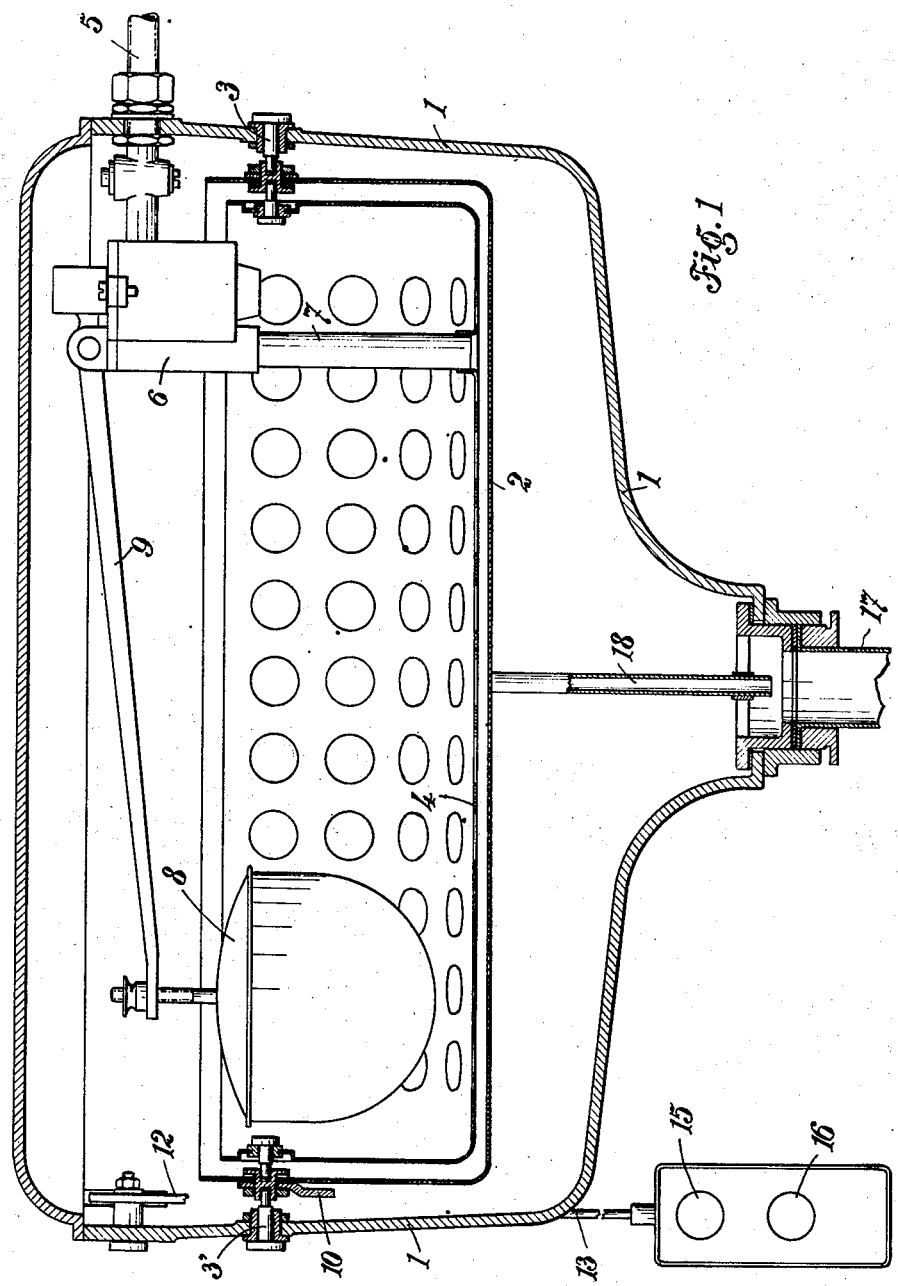
Figure 2:
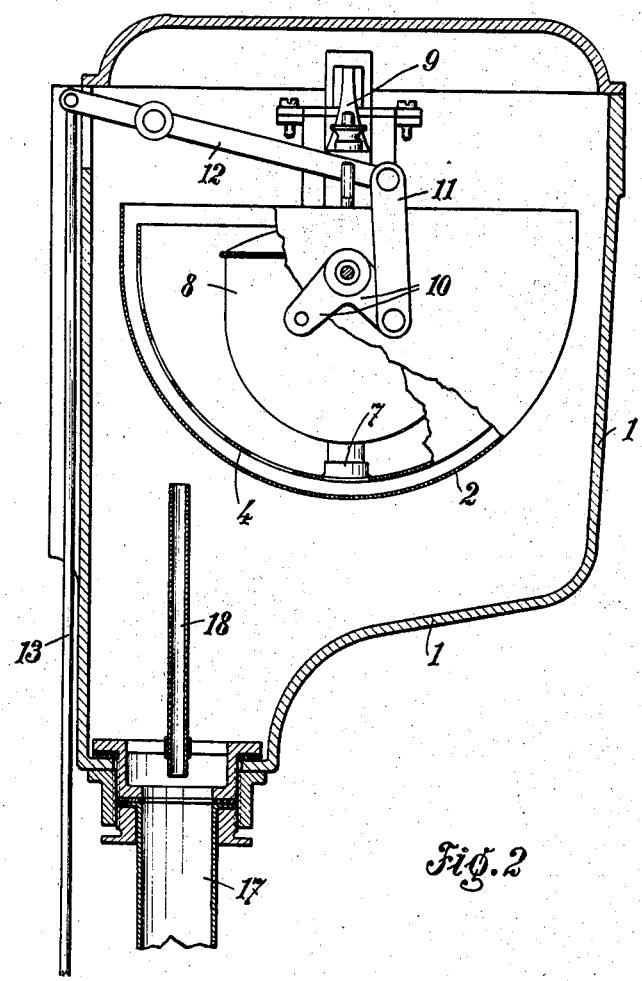
Figure 2:
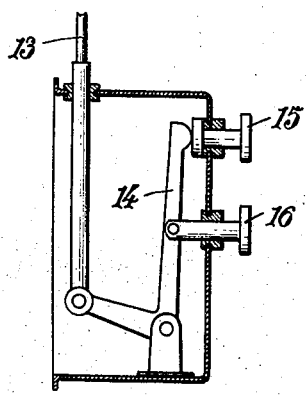

A constructional form of the invention is shown, by way of example, in the accompanying drawings, of which Fig. 1 is a longitudinal section of the new water-closet cistern and Fig. 2 a cross section of the same.

Referring to the drawings, the vessel 1 adapted to the usual shape of water-closet cisterns houses a vessel 2 which may rotate about its longitudinal axis. The vessel is pivoted at pins 3, 3' screwed into the transverse walls of the vessel 1 and tightened against these walls. The walls of the vessel 2 have a cylindric shape and surround a second cylindric vessel 4 which is, however, stationary. The vessels 2 and 4 are open at the top. An inlet pipe 5 leads the water through the wall of the container or vessel 1 and a float operated valve 6 into the interior of the vessels 2 and 4. The pipe 7 leading into the interior of the vessels is preferably used for fixing the inner vessel against turning about its axis and merges into the space between the vessels 2 and 4. The float 8 of the valve 6 is accommodated in the interior of the vessel 4 and moves the valve by means of the lever 9. The inner water vessel 4 has sieve-like perforated walls while the walls of the vessel 2 have no such perforations. The sieve-like perforations must not be arranged uniformly all over the whole circumference of the vessel 4, it suffices if only a few or even a single discharge aperture is provided at the bottom of the vessel. The distance between the walls of the containers 2 and 4 should be made as small as possible. The turning or tilting of the tiltable vessel is brought about by a lever arm 10, operated by a system of rods 11, 12, 13. The rod 13 which may also be replaced by a pull-chain is secured with its lower end to a cranked lever 14 which may be operated by one of the two push-buttons 15, 16. The arrangement is made in such a manner that the push-button 16 turns the cranked lever by a greater angle than the push-button 15. The lever 10 is two-armed so that the system of operating rods for turning the tiltable vessel may be easily arranged on either side of the vessel 1; it is only necessary to reverse the position of the vessel 2 in the respective bearings 3, 3'.

If, for actuating the novel flushing device, one of the two push-buttons 15, 16 is pressed, the tiltable vessel 2 is turned out of its rest position and the flushing water flows through the wall apertures of the vessel 4 into the outer vessel 1 and thence through the discharge pipe downwards. The vessel 4 has the purpose to prevent too sudden a discharge of the tiltable vessel 2 and the troubles in connection with such a sudden discharge such as great noise and irregular flow. If the upper button 15 is pressed the tiltable vessel will be turned by a small angle only which gives a slight flushing. Pressing the lower button 16 will turn the tiltable vessel by at least 90° causing a complete discharge of water, thus strong flushing. It is of course possible further to adjust the quantity of flushing water by partial depression of the push-buttons and shorter or longer actuating of same. In order to obtain a smooth and almost noiseless discharge of the flushing water through the discharge pipe 17, a thin pipe 18 is arranged where the discharge pipe ends in the vessel 1, said thin pipe 18 projecting downwards into the said discharge pipe while the upper end extends somewhat over the highest possible water level in the outer vessel 1. Thus the pipe 18 sucks a certain amount of air into the discharge pipe during the flushing process and, therefore, ensures a uniform and noiseless discharge of the remaining water at the end of the flushing process. The refilling of the vessels 2 and 4, after the flushing, is controlled by the float operated valve 6.

In addition to the merits outlined above, the invention involves the progress of a more simple and safe design, dispensing more particularly with the usual siphon that often gives rise to troubles.

I claim:

1. A flushing device, more particularly for water closets, comprising an outer vessel provided with a discharge pipe, a tiltable liquid container arranged within said outer vessel, and a further stationary container accommodated in the interior of the said tiltable liquid container, the walls of the said stationary container being provided with apertures.

2. A flushing device, more particularly for water-closets, comprising an outer vessel provided with a discharge pipe, a tiltable liquid container arranged within said outer vessel, said liquid container having walls forming part of a surface of revolution, a further stationary container accommodated in the interior of said tiltable liquid container, the walls of said stationary container being provided with apertures and forming part of a surface of revolution disposed substantially in coaxial relationship to the walls of the said tiltable liquid container.

3. A flushing device, more particularly for water-closets, comprising an outer vessel provided with a discharge pipe, a tiltable liquid container arranged within said outer vessel, said liquid container having walls forming part of a surface of revolution, a further stationary container accommodated in the interior of said tiltable liquid container, the walls of said stationary container being provided with apertures and forming part of a surface of revolution disposed substantially in coaxial relationship to the walls of said tiltable liquid container and within a short distance of said tiltable liquid container.

4. A flushing device, more particularly for water-closets, comprising an outer vessel provided with a discharge pipe, a tiltable liquid container arranged within said outer vessel, said liquid container having walls forming part of a surface of revolution, a further stationary container accommodated in the interior of said tiltable liquid container and having walls provided with sieve-like perforations, said walls also forming part of a surface of revolution and being disposed substantially in coaxial relationship to the walls of said tiltable liquid container.

5. A flushing device, more particularly for water-closets, comprising an outer vessel provided with a discharge pipe, a tiltable liquid container arranged within said outer vessel, said liquid container having walls forming part of a surface of revolution, a further stationary container accommodated in the interior of said tiltable liquid container and having walls provided with apertures, said walls forming part of a surface of revolution and being disposed substantially in coaxial relationship to the walls of said tiltable liquid container, and finally a water inlet pipe merging into the space between said tiltable liquid container and said interior stationary container.

6. A flushing device, more particularly for water-closets, comprising an outer vessel provided with a discharge pipe, a tiltable liquid container arranged within said outer vessel, a further stationary container accommodated in the interior of said tiltable liquid container and having walls provided with apertures, and means for turning said tiltable liquid container, said means being adapted to obtain a great or a small swing of said tiltable liquid container, corresponding to a strong or a slight flushing, respectively.

MICHAEL KOLARIK.